United States Patent [19]

Höckele et al.

[11] 4,424,889
[45] Jan. 10, 1984

[54] PHASE BREAK-SECTION INSULATOR DEVICES OF HIGH TENSILE STRENGTH

[76] Inventors: Max Höckele, Fichtenstrasse 3, Berglen-Steinach, D-7061; Werner Müller, Karlstrasse 17, Fellbach, both of Fed. Rep. of Germany, D-7012

[21] Appl. No.: 243,191

[22] Filed: Mar. 12, 1981

[51] Int. Cl.³ .............................................. B60M 1/18
[52] U.S. Cl. ...................................................... 191/39
[58] Field of Search .................. 191/39, 6, 15, 33 PM

[56] References Cited

U.S. PATENT DOCUMENTS 4,018,315  4/1977  Proud .................................... 191/39
4,187,934  2/1980  Senften .................................. 191/39

FOREIGN PATENT DOCUMENTS 238110  2/1960  Australia .............................. 191/39
2014021  4/1969  Fed. Rep. of Germany ........ 191/39

Primary Examiner—Richard A. Schacher

[57] ABSTRACT

Phase break-section insulator devices for trolley contact wires of an overhead electrified railroad include parallel insulating rods joined up at their ends with two light weight crosspieces at each end. The rods have a glass fiber center surrounded by a tube of polytetrafluoroethylene, and this tube has grooves therein to prevent spread of moisture and dirt along the rod. Each rod end is joined to a metal sleeve, in turn joined to one of the end crosspieces. A contact wire clamp is secured between the two crosspieces at each end. A separate contact wire clamp adjacent each end of the device has current collector guides attached and extending along the device on opposite sides and also attached to the ends of the crosspieces. The crosspieces have openings for the contact wire and insulating rods to allow installation and adjustment of the device on the contact wire before this wire is cut. Similar crosspieces and guides may be used in the center section of a phase break. Supporting bars with weight reducing holes (as the guides also have) are attached to crosspieces for suspension of the device. Various guide, horn and arc extinguisher configurations are provided. Overlapping guides may be provided to provide no interruption of power when a current collector passes through a section insulator. Grooves may be provided all across insulating rods normally contacted by a current collector by adding an auxiliary current collector riding surface attached to the rods. Identical section insulator modules may be connected together by a grounded or ungrounded contact wire to provide a phase break.

34 Claims, 15 Drawing Figures

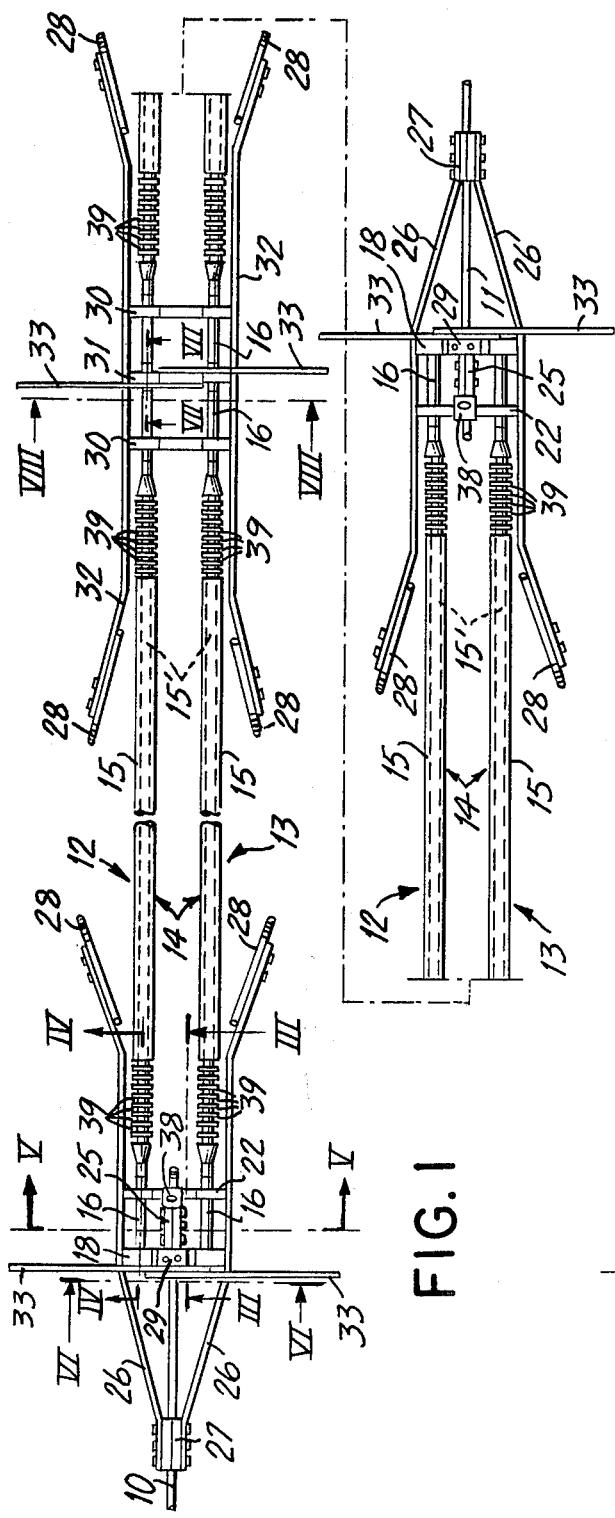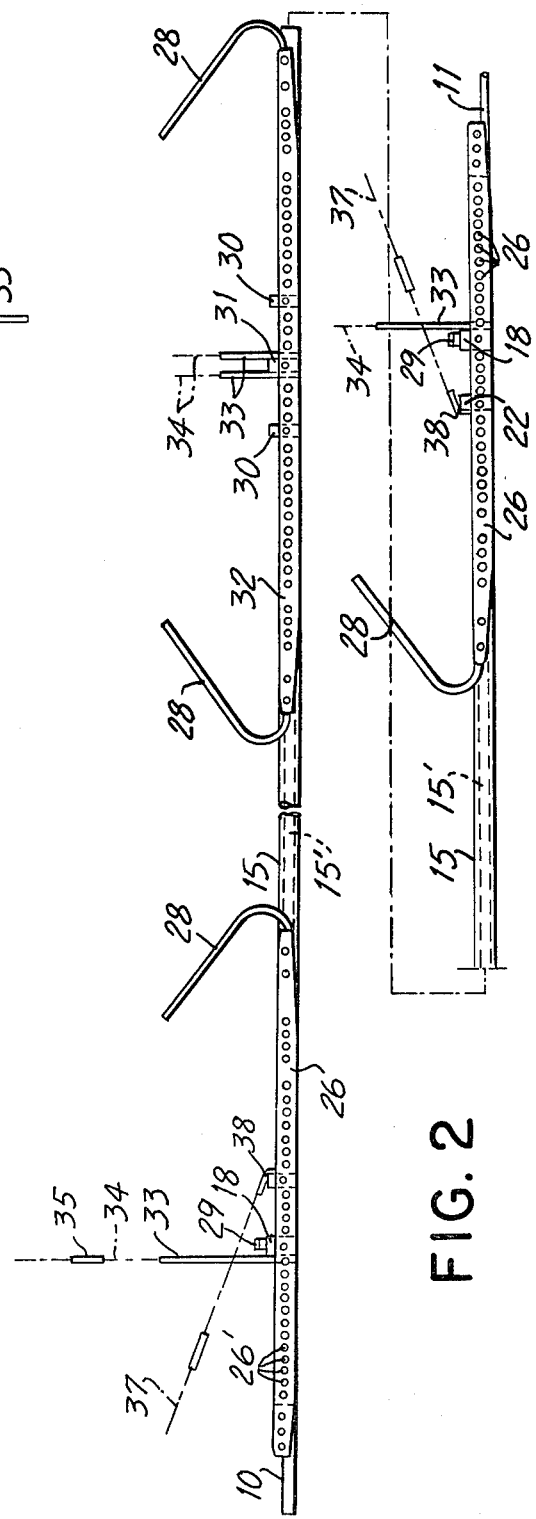

PHASE BREAK-SECTION INSULATOR DEVICES OF HIGH TENSILE STRENGTH

BACKGROUND OF THE INVENTION

This invention relates to phase break and section insulator devices for an electrical traction system to establish electrically insulating connections of high tensile strength between two energized sections of the trolley contact wire in the traction system.

The known devices of this type, which are used as section or phase insulators between two contact wire sections ending at a distance from each other, suffer from a number of disadvantages. Their design is either relatively unstable or else complicated, difficult to assemble, expensive, heavy, and not capable of being mounted on the contact wire before this wire has been cut into two pieces in order to obtain two sections. This latter aspect makes the installation considerably more difficult because the contact wire ends which are to be joined by the section or phase insulator must then be held in the correct position by an auxiliary device. Also, if this installation method is used, it can, as a rule, not be avoided that one or several kinks are made in the contact wire to cause the current collector to lose contact with the wire at high speeds. Further, the heavy weight of certain known devices causes a shock on the current collector of the vehicle being supplied with power from the contact wire when it passes the insulator. This shock exerts a force on said collector in the direction which can cause the collector to lose contact with the wire, and mechanical damage also can result from bouncing. The force on the current collector grows with the speed of the vehicle. As it is mandatory to prevent the collector from losing contact with the wire as a result of the shock and as the maximum speed with which the collector can pass the known section and phase insulators without losing contact with the wire is only slightly above current speeds, the known section and phase insulators cannot be used for the higher speeds.

The disadvantages described above also apply to known designs of section or phase insulators which use glass fiber reinforced plastic rods as insulating elements, as these insulators, too, cannot be installed on the contact wire before this wire has been cut at the point of installation, and as they also are comparatively heavy.

Another disadvantage of known section and phase insulators is that they generally must be of different design from each other and have not been constructed of common or identical modules, the phase insulator generally having a rigid grounded center section. This creates added manufacturing and storage complexity.

Still further disadvantages of known section and phase insulators include the buildup of moisture and dirt deposits on the insulating elements to cause failure or at least periodic maintenance and cleaning.

Known section and phase insulators in addition often do not provide adequate protection of the insulating elements against damage caused by electrical arcs, and do not sufficiently extinguish arcs.

SUMMARY OF INVENTION

In the present invention, the phase break-section insulator devices of high tensile strength include parallel spaced insulating rods joined up at their ends with light weight crosspieces. The rods, which transfer the tensile forces from separate sections of contact wire, have a glass fiber center surrounded by a tube of polytetrafluoroethylene, and the tubes may have grooves cut therein to prevent the spread of moisture and dirt deposits along the rods. At each end of the device, each rod is tightly joined at its end to a metal sleeve which in turn abuts and is securely attached to a metal crosspiece. A second crosspiece is spaced inwardly from the first crosspiece at each end of the device, and a clamp is secured between each first and second crosspiece to serve to secure the contact wire to the device at each end. Openings for this contact wire are provided in both crosspieces, at each end of the device, and openings for the sleeves are provided in the second crosspieces at each end so that the device may be laid upon and connected to the contact wire without initally cutting the wire. In the case of a phase break, three corresponding crosspieces can be provided at the grounded center section. One crosspiece will attach to metal sleeves on the incoming insulating rods on each side of the center section. That crosspiece and the other two center sections crosspieces (which also provide openings for passage of the metal sleeves) also provide openings for the contact wire to allow installation of the phase break before the contact wire is cut. At each outside end of the phase break-section insulator device, a clamp is attached to the contact wire. In turn attached to each clamp and extending therefrom and along some portion of the device are guides for the vehicle current collector to ride upon, the guides also being attached to the outside ends of the crosspieces previously mentioned at the ends of the devices in order to lend rigidity to the device. In the case of a phase break, such guides also may be used in the rigid grounded center section and are attached to the outside ends of the crosspieces thereat. The guides are electrically conductive, have holes therein for weight reduction, and serve to prevent the vehicle current collector from contacting the clamps, sleeves, crosspieces, etc. Supporting bars with weight reducing holes also may be attached to and extend obliquely from crosspieces for suspension at their free ends in order to suspend and position the device.

In installation, the phase break-section insulator device is simply placed on the contact wire, the various clamps are affixed to the contact wire, suspension means are attached and adjusted to place the device in desired position, and the contact wire is only then cut.

Various configurations of guides and arc horns and extinguishers also are provided for in the present invention depending upon particular applications of phase break-section insulator devices. Certain overlapping guide configurations in a section insulator also allow the vehicle current collector to pass through the device without the interruption of the power supply through the current collector.

Depending upon the application involved for the present invention, the vehicle current collector may encounter only the aforementioned guides in passing from one end of the device to the other, or may leave the guides and ride against the insulating rods for a portion of travel across the device. When the vehicle current collector only encounters the guides in its travel, the insulating rods may have grooves therein throughout their lengths to avoid the spread of moisture and dirt deposits. When the current collectors normally would encounter a portion of the insulating rods but it is considered desirable to groove the rods throughout their lengths, an auxiliary riding surface may be attached to and extend between the rods. The current collector will then encounter the guides and auxiliary riding surface, and not the grooved rods.

As a further feature of the invention, a section insulator module is provided which may be attached by a grounded or ungrounded section of contact wire to an identical section insulator module, to thereby provide a phase break device. By this means, manufacturing simplicity and economy are achieved, and additionally, a flexible rather than rigid center section is provided for in a phase break. The flexible center section allows the phase break to be used at a curve in the traction system.

Accordingly, a first object of the invention is a device for establishing an electrically insulating connection of high tensile strength between two sections of the contact wire of an overhead line, which permits operation at considerably higher speeds than are possible with the known devices.

A further object of the invention is a device of the type referred to having dynamic characteristics under tension that approximate the dynamic characteristics of the trolley wire in order to give the current collector a smooth ride without bounce.

An additional object of the invention is a device of the type referred to, which weighs as little as possible.

A further object of the invention is a device for establishing an electrically insulating connection of high tensile strength between two sections of the contact wire of an overhead line which can be installed without causing any kinks in the contact wire.

Another object of the invention is a device of the type referred to which can be installed on the contact wire before the latter is cut and which preferably cannot only be installed on the contact wire before it is cut but can also be finally adjusted in the desired position.

A further object of the invention is a device of the type referred to which can be assembled in a simple and time-saving manner and can then be installed on the contact wire in an equally simple and time-saving manner.

Another object of the invention is a device of the type referred to whose cost is low due to its simple contruction and installation.

Another object of the invention is a device of the type referred to whose insulating characteristics in the longitudinal direction of the contact wire have been improved to such an extent that, even if unfavorable external condition such as moisture and dirt deposits on the insulators occur, failures are excluded and no periodic maintenance is required.

Another object of the invention is a device of the type referred to with improved protection of the insulating elements against damage caused by electric arcs and with improved capacity for extinguishing such arcs.

Another object of the invention is a device designed as a section insulator of the type referred to which permits the vehicle to pass the section insulator without interruption of the power supply through the current collector.

An additional object of the invention is a device of the type referred to with provision for constructing either a section insulator or a phase break from the same basic module.

These objects of the invention and others are shown in the drawings and the following description of various embodiments of the device according to the invention.

DESCRIPTION OF THE DRAWINGS

FIG. 1 is a top view of a first embodiment forming a phase insulator,

FIG. 2 is a side view of the first embodiment,

DESCRIPTION OF EMBODIMENTS

A phase insulator (phase break) which can be mounted on the trolley contact wire of an overhead line for electrically operated rail vehicles and be completely adjusted before a piece is cut from the contact wire in order to obtain two separate contact wire sections 10 and 11, which establishes an electrically insulating connection of high tensile strength between the opposing ends of these contact wire sections 10 and 11, comprises, as shown in FIGS. 1 and 2 two insulating rods which are parallel to and at a distance from each other and as complete units are designated by 12 and 13. They are identical and do not only electrically insulate the sections of the contact wire, but also transmit the tensile force which is exerted by the contact wire sections on the phase break.

As it is often desirable in a phase break to ground the insulating section at its center point, each of the two insulating rods consists of two identical insulating rod elements 14, each of which comprises a center 15' of glass fiber and a tube 15 which concentrically surrounds said center and is made of polytetrafluoroethylene (PTFE).

Polytetrafluoroethylene provides long wear and antitracking characteristics, and rods constructed as set forth provide desired flex and tensile strength characteristics. The dynamic characteristics of these rods under tension approximate the dynamic characteristics of the trolley contact wire, so that the current collector obtains a smooth ride free of bounce. Each of the two ends of each center 15' engages a thick-walled sleeve 16 made of metal, in particular a copper alloy or an aluminum alloy, and is tightly mechanically attached into said sleeve. The outside diameter of sleeve 16 is generally somewhat smaller than the outside diameter of tube 15, so as to ensure that a current collector passing the phase break does not make contact with sleeve 16, in order to prevent wear of said sleeve. A central tapped hole is provided at the end of sleeve 16 which points away from center 15'.

Figure 7:
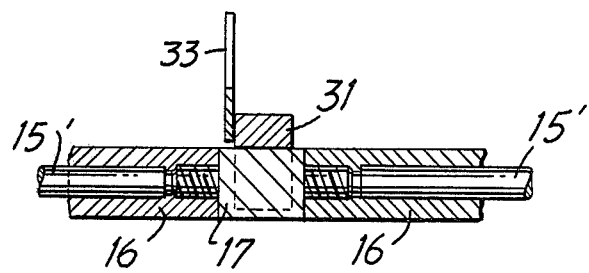
FIG. 7 is an enlarged section along line VII—VII of FIG. 1.

The sleeves 16 at those ends of rods 15' which face each other at the center section of the phase break are joined by means of a spacer 17 (see FIG. 7) which consists of the same material as the sleeves 16 and whose middle section has the same outside diameter as the sleeves. The two end sections are threaded and are screwed into the two sleeves 16 which are to be joined. The length of the middle section of spacer 17 is selected in such a manner that the two insulating rods 12 and 13 have exactly the same length.

The sleeves 16 which are placed on the ends of insulating rods 12 and 13 pointing away from each other, at the opposite ends of the phase break, lie with their faces abutting a traverse or crosspiece bar 18 at each end which is common to the two insulating rods. The crosspiece bars 18 which are made of metal, for example a copper alloy, or an aluminum alloy in order to reduce their weight, are of identical design and have the shape of a bar with rectangular cross-section standing on one of its narrow sides. Two bolts 19 each pass at the identical height through the two crosspieces 18 and engage the sleeves 16 which lie against the crosspiece; by this mean the insulating rods 12 and 13 are fastened to the crosspieces 18 in such a way that the connection withstands pull. The distance of bolts 19 from the lower edge of crosspieces 18 is chosen in such a manner that the bottom surface of the insulating rods 12 and 13 is lower than the bottom surface of the crosspieces. Groove-shaped recess 20 which is open toward the bottom partly engages contact wire 10 and 11.

Figure 3:
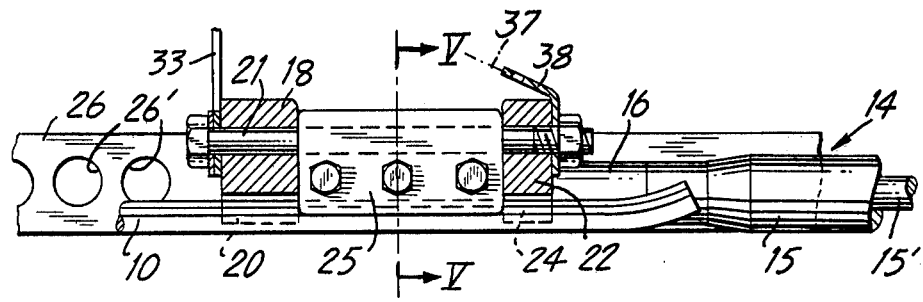
FIG. 3 is an enlarged section along line III—III of FIG. 1.
Figure 4:
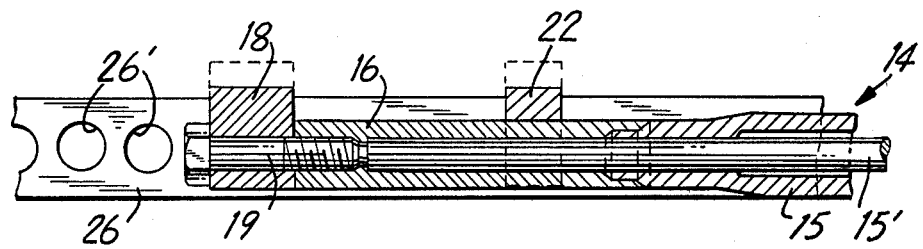
FIG. 4 is an enlarged section along line IV—IV of FIG. 1.
Figure 5:
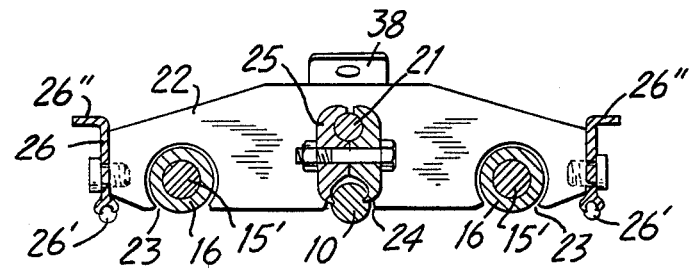
FIG. 5. is an enlarged section along line V—V of FIG. 1.

Rod 21 which passes through crosspiece 18 above recess 20 and is parallel to sleeves 16 passes also through the second crosspiece bar 22 (see FIG. 3), which is placed in the direction toward rod 15' at a distance from the first crosspiece 18; the shape of crosspiece 22 is, like that of crosspiece 18, that of a rectangular bar standing on its narrow side. Rod 21 is threaded at both ends, with nuts 21' attached thereto; alternatively, rod 21 and nuts 21' may be replaced by a bolt and nut. The two crosspieces 22 also consist of metal, for example a copper alloy or an aluminum alloy. As shown in FIG. 5, each crosspiece bar 22 comprises two symmetrically placed openings or grooves 23 which are open toward the bottom and are circular in shape. These grooves are fitted to the outside diameter of sleeves 16 and match these sleeves in the radial direction so that they follow their shape without necessarily extending around their bottom. As the second crosspieces 22 do not have to transmit the tensile forces, their thickness is less than that of the first crosspieces 18. An opening 24 which is provided in the middle of the lower surface of this second crosspiece 22 and is open toward the bottom partly receives the contact wire.

The distance between second crosspiece 22 and first crosspiece 18 is determined by the length of screw clamp 25 which can be placed on the contact wire from above and forms a first contact wire clamp. The two jaws of said clamp lie side by side and form an upper clamping groove which receives rod 21 and a lower clamping groove which grips the top of the contact wire. The length of screw clamp 25 and its clamping force are chosen in such a manner that it can by itself securely hold contact wire section 10 or 11.

As the longitudinal axis of the insulating rods 12 and 13 lies higher than the longitudinal axis of the lower clamping groove which grips the head of the contact wire, the force exerted by the contact wire on the phase break creates a torque which tends to bend downwards the end of the contact wire section. This torque, however, is being compensated and therefore cannot cause the clamping groove holding the top of the contact wire to be moved from its position parallel to the longitudinal axis of the insulating rods. The compensation is effected on one hand by means of a stay wire or rope 37 one of whose ends is attached to bracket 38 fastened to the midpoint of second crosspiece bar 22 and extending upwards beyond that bar. Stay wire 37 runs, as shown in FIG. 2, at an acute angle from bracket 38 to a point of the supporting structure which lies above contact wire 10 or 11, and is attached at said point.

In addition, pairs of current collector guides 26 provided at both ends of the phase break prevent a change in position of screw clamp 25. The guides 26, which stand on their narrow side, include a series of holes 26' in order to reduce their weight and consist of a material which is a good conductor of electricity; they are screwed to crosspieces 18 and 22 with whose outsides they are in contact and extend not only toward the midpoints of the insulating rods 12 and 13, but also in the opposite direction beyond the first crosspiece 18 as far as a second contact wire clamp 27 which is attached to contact wire section 10 or 11 at a distance from the first crosspiece bar. This second contact wire clamp 27 lies between the ends of the two guides 26 which approach it in the direction from the first crosspiece, and is screwed to these ends. A downward shift of the end of screw clamp 25 which is in contact with second crosspiece 22 would therefore cause lifting of the second contact wire clamp 27, which is not possible as the later is fastened to the contact wire. The second contact wire clamp, too, can be placed on the contact wire from above and comprises two jaws lying side by side, which clamp the top of the contact wire between them and are tightened by means of screws which are also used to fasten the end of the guides to this clamp.

As shown in FIG. 1, the middle section of the guides 26 extends from the first crosspiece 18 beyond the second crosspiece 22 and continues for a certain length, at a distance from the outside of and parallel to one or the other of insulating rods 12 or 13, respectively. The end section of guides 26 which starts approximately at the midpoint of the insulating rods points away from the insulating elements 14 and carries at its free end an arcing horn 28, which is screwed on so that it can be easily adjusted and replaced. The bottom surface of guides 26, with the exception of the end sections, lies slightly lower than the bottom surface of the crosspieces 18 and 22 and the bottom surface of sleeves 16 and insulating rods 12, 13. In the area between screw clamp 25 and second contact wire clamp 27 a current collector would therefore slide along the bottom surface of the guides 26 and the contact wire, and only touch the bottom surface of the tubes 15 as it passes from the middle section of the guides to and past their end section carrying the arcing horns. Both in this direction and in the opposite direction the transition takes place without shock.

Figure 6:
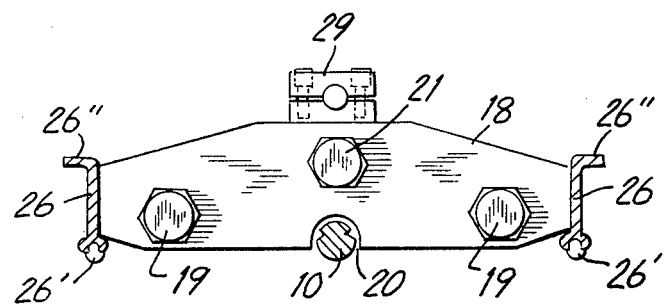
FIG. 6 is an enlarged section along line VI—VI of FIG. 1.

In order to increase their stability in the transverse direction, the guides can be equipped with a cross bar on the top as shown in FIGS. 5 and 6. If, in order to save weight, the guides consist of an aluminum alloy, it is, in order to provide sufficient wear resistance, desirable to provide a wire 26' made of copper alloy to form the bottom of the guide which serves as a skiding surface for the current collector. The top of said wire lies in a clamping duct of the guide, as shown in FIGS. 5 and 6. The part of guides 26 which consists of aluminum alloy can be coated with an insulating layer 26″ of polytetrafluoroethylene (PTFE).

The sleeves 16 used to connect the insulating elements 14 with each other, and the spacer 17 of each insulating rod, are held by two crosspieces 30 and a crosspiece 31 lying midway between these two crosspieces at the center section of the phase break. All these three crosspieces are essentially of the same design as the two crosspiece bars 22, i.e., they each comprise two grooves or openings which are open toward the bottom, but closely fit the sleeves 16 and the spacer 17 in the radial direction. Grounding conductors are attached to each of the two crosspieces 30 by means of a cable terminal or similar device. Two guides 32 which are in contact with the outer end surfaces of crosspieces 30 are of the same design as the guides 26; their purpose is to guide the current collector without shock from one insulating rod to the other so that it does not make contact with the crosspieces, the sleeves and the spacers. The middle part of guides 32 which is parallel to the insulating rods extends beyond the ends of the sleeves as shown in FIG. 1, and runs for a certain length outside at a distance from the insulating rods 14. The two end sections point toward the outside away from the insulating rods 14. At their ends they carry arcing horns 28 which are attached in such a manner that they can be replaced.

The two screws used to attach the guides 32 to the end surfaces of the middle crosspiece 31 penetrate into the adjoining spacer 17 and thus hold it in position. As the guides 32 are also screwed to the two crosspieces 30, these crosspieces are also held in a fixed position.

Figure 8:
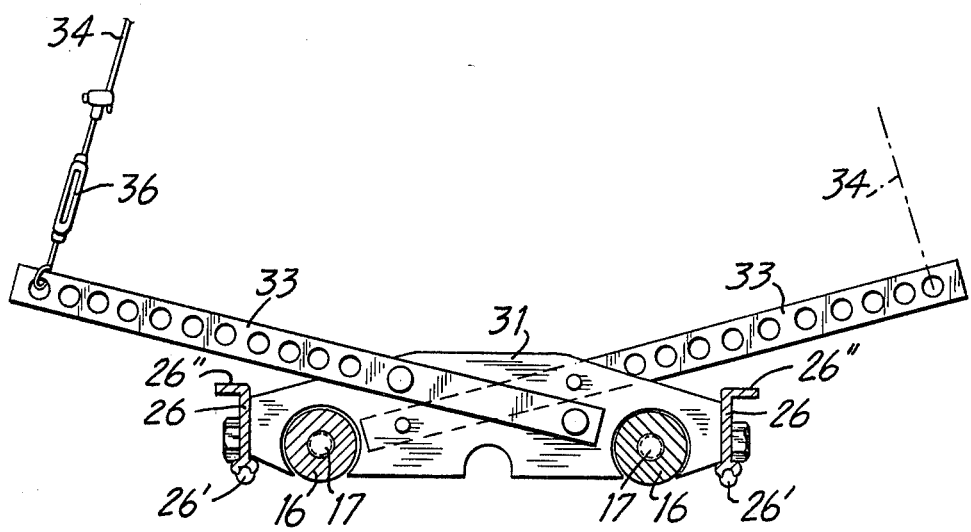
FIG. 8 is an enlarged section along line VIII—VIII of FIG. 1.

Two supporting bars 33 each are screwed to the sides of crosspiece 31 facing the crosspieces 30 and to the side of crosspiece 18 facing away from crosspiece 22. These supporting bars obliquely extend upwards, as shown in FIG. 8 for crosspiece 31. In order to save weight the supporting bars 33 are perforated. The free ends of supporting bars 33 are used to attach supporting ropes 34 which are used to suspend the phase break from the supporting structure of the overhead line. The adjusting devices 36 provided in the supporting ropes 34 permit an exact length adjustment of the supporting ropes and thus of the position of the phase break.

In those sectors of the insulating rods 14 in which the current collectors do not slide on the bottom surface of tube 15, but on guides 26 and 32, i.e., in the two end sections of insulating rods 14 lying between the middle sections of the guides, circular grooves 39 have been cut in the tubes 15 at a distance from each other in the longitudinal direction of the tube. These circular grooves 39 enable water and other liquids to drip off and prevent the formation of a continuous surface of carbon and other contaminants covering the entire length of the rod, thus preventing leakage currents and arc-overs. The grooves do not extend all the way through tubes 15, and are sufficiently wide so that water generally will not bridge them in wet conditions. The insulating characteristics in the longitudinal direction are substantially improved by these circular grooves, which provide a very long leakage path. The outer diameter of tubes 15 in the longitudinal sectors of grooves 39 also may be made slightly less than the outer diameter of tubes 15 in the adjacent ungrooved sectors to assure that the current collector does not inadvertently strike the tube 15 in the sector of the grooves.

When such a phase break is installed on a contact wire which has not yet been cut, it is first placed on the contact wire from above, the two screw clamps 25 are clamped first to the contact wire, and then the two second contact wire clamps 27 are clamped to the contact wire. The second clamps would be able to securely hold the contact wire sections if the screw clamps 25 were unable to do so for any reason whatsoever. As crosspieces 30 and 31 as well as crosspieces 18 and 22 comprise in the middle a groove-shaped recess which is open toward the bottom and which can be engaged by the contact wire, the installation is not interfered with by the continuous contact wire. After the screw clamps 25 and the second contact wire clamps 27 are tightened and the supporting ropes 34 and the stay ropes 37 have been attached and the adjustment by means of these ropes has been completed, the contact wire is cut a certain distance from the second crosspiece 22. The end extending beyond the second crosspiece 22 is then bent slightly upwards, so that it will be sufficiently far above the sliding path of the current collector.

Figure 9:
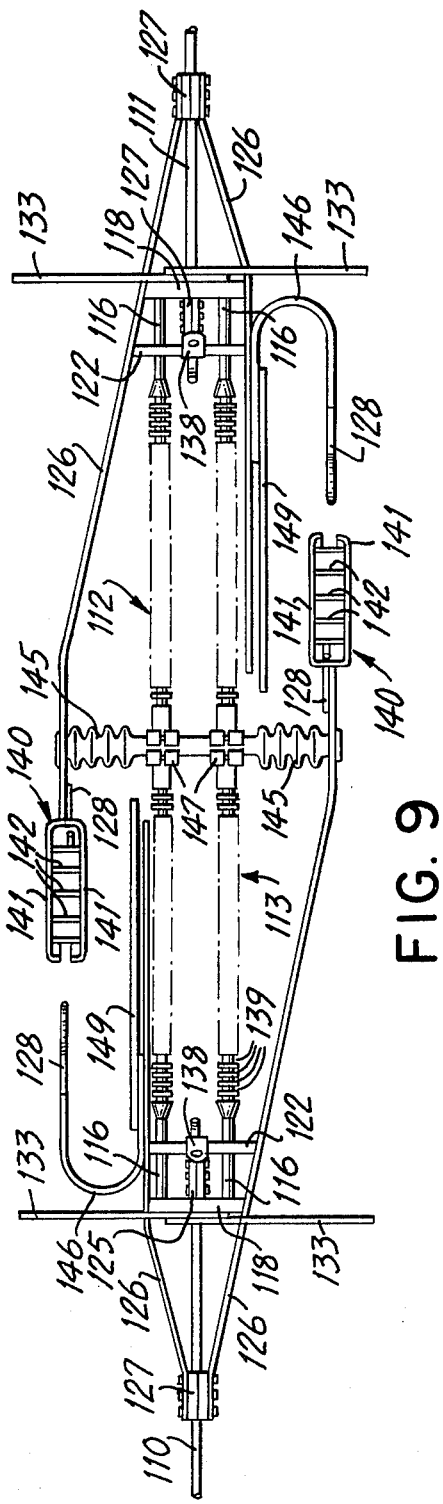
FIG. 9 is a top view of a second embodiment, designed as section insulator.
Figure 11:
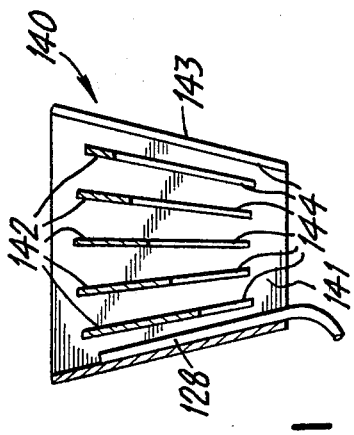
FIG. 11 is a section along line XI—XI of FIG. 9.

The embodiment shown in FIGS. 9 and 11 is a form of section insulator which can be passed in both directions. Just as the embodiment shown in FIGS. 1 to 8, it can be placed on the uncut contact wire of an overhead line for electrically operated rail vehicles and be installed on that wire. After the insulator has been installed and the contact wire cut, the two sections of the contact wire are insulated from each other. The design of this embodiment is largely identical with the embodiment designed as a phase break and shown in FIGS. 1 to 8. For this reason corresponding parts are identified by reference numbers which are greater by 100 than the ones used in the first embodiment. In order to eliminate repetition reference is made to the explanations of the first embodiment.

The two insulating rods 112 and 113 establish a mechanically solid and electrically insulating connection between the two contact wire sections 110 and 111. They each consist of a single fiber-glass rod and a tube of polytetrafluoroethylene (PTFE). In contrast to tube 15, tube 115 carries along its entire length circular grooves 139 which are spaced at a distance from each other in the longitudinal direction. This considerably improves the insulating capacity in the longitudinal direction of the rod even under unfavorable conditions and brings the length of the rod to a minimum. This in turn minimizes the weight of the section insulator. Otherwise, the design is the same as that of the insulating rods 14 of the first embodiment. Identical with the design of the first embodiment is also the connection of the two insulating rods 112 and 113 at both their ends with thickwalled sleeves 116 which have a somewhat smaller diameter and consist of metal, for example of a copper alloy or an aluminum alloy. These sleeves in turn are, just as in the first embodiment, attached to two crosspieces 118 and 122, which are both identical in design and location to the first embodiment. The first contact wire clamp 125, which can be placed on the contact wire from above, is located between the crosspieces 118 and 122 of each pair of crosspieces; with respect to its design and attachment reference is made to the description of the first embodiment. Identity with the first embodiment exists also in that the guides 126 which are designed as perforated bars standing on their narrow sides and which guide the current collector without shock along the section insulator, lie against the outside surfaces of the crosspieces 118 and 122 and are screwed to the latter. The guides also support between their ends on one side a second contact wire clamp 127 which grasps the top of the contact wire at a distance in front or in back of respectively the first contact wire clamp and is designed the same as the second contact wire clamp 27 of the embodiment shown in FIGS. 1 to 8. Finally, just as in the last-named embodiment, a bracket 138 protrudes on top in the middle of the two second crosspieces 122, and a stay rope 137 is fastened to each of these brackets. Location and purpose of the stay ropes 137 are the same as those of stay ropes 37.

A first difference from the first embodiment is that, as shown in particular by FIG. 9, only one of the two guides 126 which extend from one to the other end of the section insulator ends in the half in which the crosspieces are located which support it. In addition these two short guides do not comprise an end section which is bent toward the outside and extends away from the insulating rod. Each of the two other long guides runs, at the same angle as the end section lying between second contact wire clamp 127 and crosspiece 118, past crosspiece 122 to the outer end of transverse insulator 145. The adjoining end section runs parallel to the insulating rods and extends so far beyond their midpoint that it overlaps the short guides. In the area of the overlap the distance of the guides 126 from each other is a multiple of the distance between the short guide and the insulating rod lying next to it. Due to this arrangement the distance between an electric arc which may be generated and the insulating rods is comparatively large. In order to further reduce the danger caused to the insulating rods by electric arcs vertical protective plates 149 of asbestos or a similar material, are provided on the outside next to the short guides. These protective plates are attached to the crosspieces 118 and 122 and shield the insulating rods.

Figure 10:
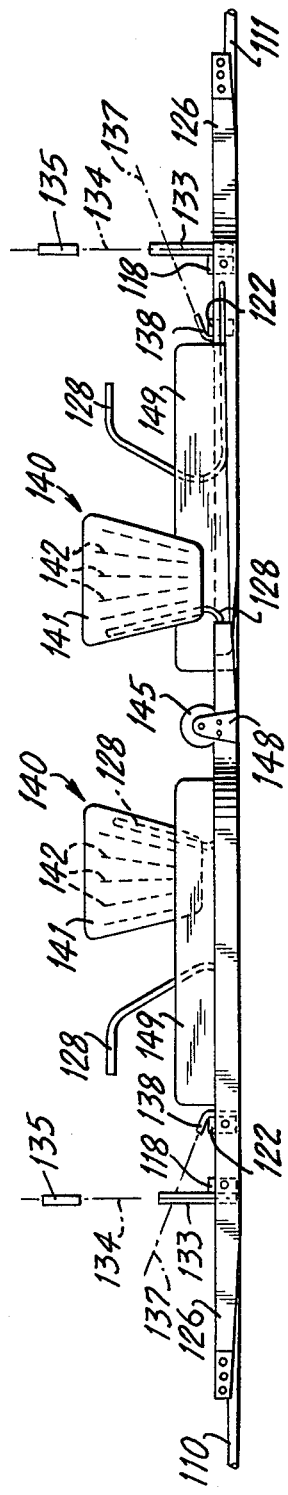
FIG. 10 is a side view of the second embodiment.

Every long guide carries just as every short guide at its free end an arcing horn 128 which is bent upwards and which is preferably screwed to the guide in such a manner that it can be detached. An arc extinguishing chamber which as a unit is designated by the reference numeral 140 is attached to this arcing horn and protrudes into the space between the arcing horn 128 which supports it and the arcing horn attached, on the same side of the section insulator, to the short guide of the other pair of guides. Each of the two identical arc extinguishing chambers 140 forms, as shown in FIG. 9, a duct which is rectangular in cross-section and extends in the vertical direction if the two insulating rods 112 and 113 are in the horizontal position and which is open on top and bottom and widens toward the top. Extinguishing plates 142 which are spaced at a distance from each other and are perpendicular to the side walls, are located between the two side walls 141 which are parallel to each other. FIG. 10 shows that the ducts formed by the extinguishing plates 142 also widen toward the top. The extinguishing plates 142 and the chamber wall 143 located farthest from arcing horn 128 carrying the arc extinguishing chamber each have a slot 144 in the middle which starts at the lower end of arc extinguishing plate 142 and of wall 143, respectively, and extends upwards. FIG. 11 shows that the slots 144 differ in length. The length of the slots increases from the extinguishing plate 142 which is closest to the arcing horn 128 carrying the arc extinguishing chamber in the direction of the chamber wall which also comprises a slot.

In order to ensure, in spite of the great differences in the distances from the insulating rods of the shorter guide 126 and the end sections of the longer guide 126 which overlap said short guide, that the arcing horn of each shorter guide is at the same distance from the insulating rods as the corresponding arcing horn with arc extinguishing chamber, the arcing horns 128 of the shorter guides are formed by the end section of a bar which, as shown in FIG. 9, forms a U-shape 146 with parallel legs which lie in a horizontal plane. One of the legs makes contact with the outside of the shorter guide in the area of the two crosspieces 118 and 122 and this is done in such a manner that the free end of the U-shape points in the same direction as the free end of that guide, to which U-shape 146 is attached in such a manner that it can be removed. The one-piece arcing horn 128 which is bent upwards and away from arc extinguishing chamber 140 is an extension of the other leg.

The plastic transverse insulator 145 crosses the two insulating rods 112 and 113 at a right angle at their midpoint and is located above the insulating rods. Two split two-way clamps 147 fasten transverse insulator 145 to the two insulating rods. The two end sections of the transverse insulator which extend from the insulating rods to the guides 126 have a substantially larger diameter than its middle section and the insulating rods. The bottom surface of these insulators lies, however, higher than the sliding path defined by the bottom surface of the guides. Circular grooves in the end sections of the transverse insulator increase its insulating characteristics. The long guides 126 are screwed to the end faces of transverse insulator 145 and are thus stabilized. In addition one bracket 148 each is also screwed to the end faces of transverse insulator 145, to which bracket there is attached one supporting rope 134 each. The transverse insulator also serves as support for the insulating rods, which aids in preventing them from sagging. This in turn makes it easier to adjust the guides 126 in such a manner that the bottom surface of the insulating rods lies only a little higher than the bottom surface of the guides.

In order to facilitate exact adjustment of the position of the section insulator after it is installed, the supporting ropes 134 fastened to the two ends of the section insulator are, as in the embodiment shown in FIGS. 1 to 8, attached to the supporting arms 133. These arms just as the supporting arms 33 of the first embodiment, are screwed in pairs to the two crosspieces 118 and extend from them transversely to the length dimension of the section insulator toward the outside and upwards, which results in a position shown in FIG. 8 for the first embodiment. The supporting ropes 134 are attached to the free ends of these supporting arms 133. Adjusting devices 136 are provided in the supporting ropes.

It is possible, particularly if the stresses are high, to provide shock absorbers, which also applies to the embodiment shown in FIGS. 1 to 8.

Figure 12:
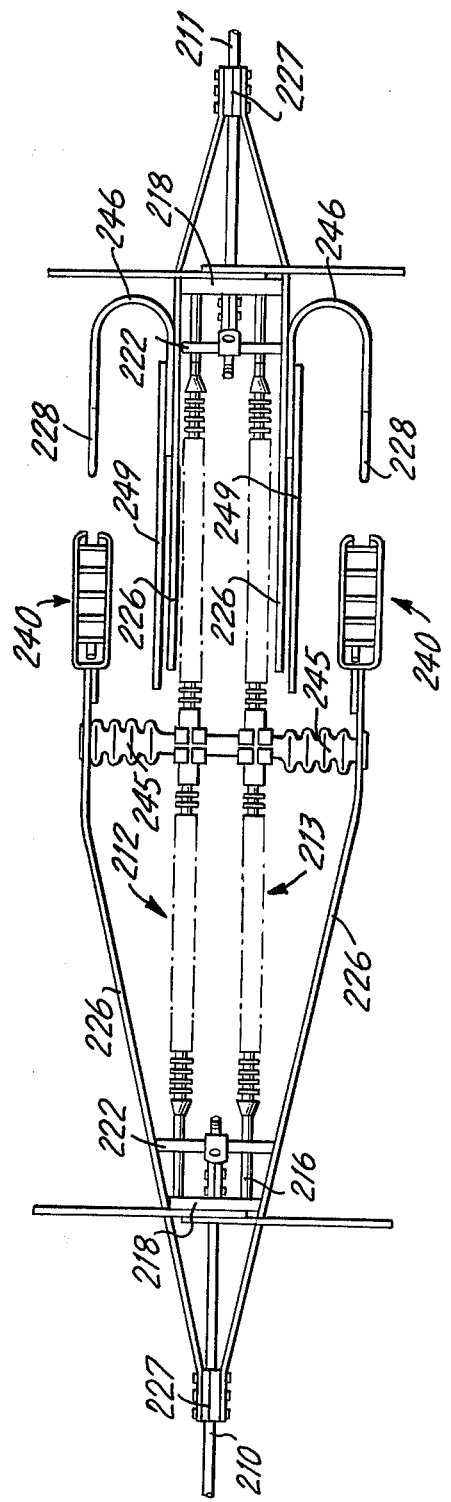
FIG. 12 is a top view of a third embodiment, designed as a section insulator.

Another embodiment shown in FIG. 12 is, just as the embodiment shown in FIGS. 9 to 11, a form of section insulator which can be passed by the current collector of an electrically powered vehicle without interruption of the power supply. In contrast to the embodiment shown in FIGS. 9 to 11, the vehicle can so pass the section insulator shown in FIG. 12 only in one direction, i.e. from left to right if viewed as in FIG. 12.

As, with exception of the guides, the design of the embodiment shown in FIG. 12 is identical with that of the embodiment shown in FIGS. 9 to 11, the FIG. 12 parts are identified by reference numbers which are greater by 100 than those of the corresponding parts of the embodiment shown in FIGS. 9 to 11. The following description only discusses the differences.

FIG. 12 shows that the two crosspieces 218 and 222 at the right end of the two insulating rods 212 and 213 are of equal length. The two identical short guides 226 run, just as the shorter guides 126 of the embodiment shown in FIGS. 9 to 11, in the area near the crosspieces and in the adjoining area next to and outward from the insulating rods, parallel to said insulating rods and end at a distance from transverse insulator 245 which crosses the insulating rods at their midpoint. The end section of the two guides 226 which extends from crosspiece 218 in the opposite direction approaches, just as in the other embodiments, at an acute angle contact wire 211 to which it is fastened by means of a second contact wire clamp 227 which is identical with the contact wire clamps of the other embodiments and can, just as these clamps, be placed from above on top of contact wire 211.

The second crosspiece 222 located at the other or left end of the two insulating rods 212 and 213 is somewhat longer than the first crosspiece 218 next to it, because the two guides 226 which are fastened to the ends of these crosspieces extend, just as the long guides of the embodiment shown in FIGS. 9 to 11, in the same direction as the end section between crosspiece 218 and the second contact wire clamp 227, i.e. at an acute angle with contact wire 210, beyond the second crosspiece 222 as far as the transverse insulator 245 and are bent in such a manner just before reaching said insulator 245 that the end section runs parallel to the insulating rods 212 and 213. This end section extends beyond the midpoint of the insulating rods and overlaps for a certain distance the short guide on the same side, just as is the case with the long guides of the embodiment shown in FIGS. 9 to 11. Just as the latter, each of these end segments carries one arcing horn 228 bent upwards and toward the back, to each of which is attached an arc extinguishing chamber which is designed and positioned just as the arc extinguishing chambers 140 of the second embodiment.

The two arcing horns 228 of the short guides 226 are located at the same distance from the longitudinal midpoint plane of the section insulator as these two arc extinguishing chambers 240. These two arcing horns are, just as in the embodiment shown in FIGS. 9 to 11, formed by the extension of a U-shape part 246 which is obtained by bending a bar and is shaped and located in the same manner as loop 146. In addition, the insulating rods 212 and 213 are, as in the second embodiment, shielded by protective plates 249, which are attached to the short guides on the outside and made of asbestos or a similar material, in the area in which the heat generated by electric arcs burning between the arcing horns could have a harmful effect.

Otherwise the design of this section insulator is the same as that of the embodiment shown in FIGS. 9 to 11. The section insulator shown in FIG. 12 therefore also has a low weight and is of simple design. It can also, as the other embodiments, be simply and quickly installed on an uncut contact wire without running the risk of creating kinks in the contact wire. Installation therefore consists, as for the embodiments shown in FIGS. 1 to 11, in placing the entire device from above on the contact wire. Then the contact wire clamps are tightened and the position of the section insulator is finally adjusted with the aid of the supporting and stay ropes. All that remains to be done after this is to cut the contact wire at two points between the two traverse bars 222. As a precaution the two ends of the contact wire are then slightly bent upwards.

Figure 13:
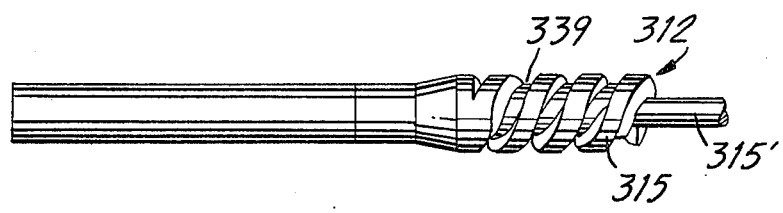
FIG. 13 is an incompletely shown side view of an insulating rod and the metal bar connected to one of its ends, in a modified design.

If the rod of glass fiber which forms the core of the insulating rod is provided with a polytetrafluoroethylene tube as a covering, as is the case in the embodiments described above, it is not difficult to cut circular grooves in this tube with a multiple cutting tool on a lathe. If, however, the covering for the rod of glass fiber consists of silicone rubber, i.e. a material which is suited for use as a covering of rods of glass-fiber such circular grooves cannot be cut in the covering or, if it can be done, only at an excessive cost. It is then necessary to provide corresponding circular grooves in the mold used for the manufacture of the covering. This is an expensive operation. FIG. 13 shows a embodiment of a modified insulating rod 312 in which tube 315 surrounding rod 315 of glass fiber consists of silicone rubber. Such an insulating rod could be used instead of the insulating rods of the above-described section insulators without making any changes in the design of the embodiments. As FIG. 13 shows, tube 315 does not carry circular grooves but one spiral groove 339. Such a spiral groove ensures practically the same improvement as the circular grooves, but the cost of machining such a spiral groove in the mold used for manufacturing tube 315 is considerably less than the cost of machining circular grooves.

Figure 14:
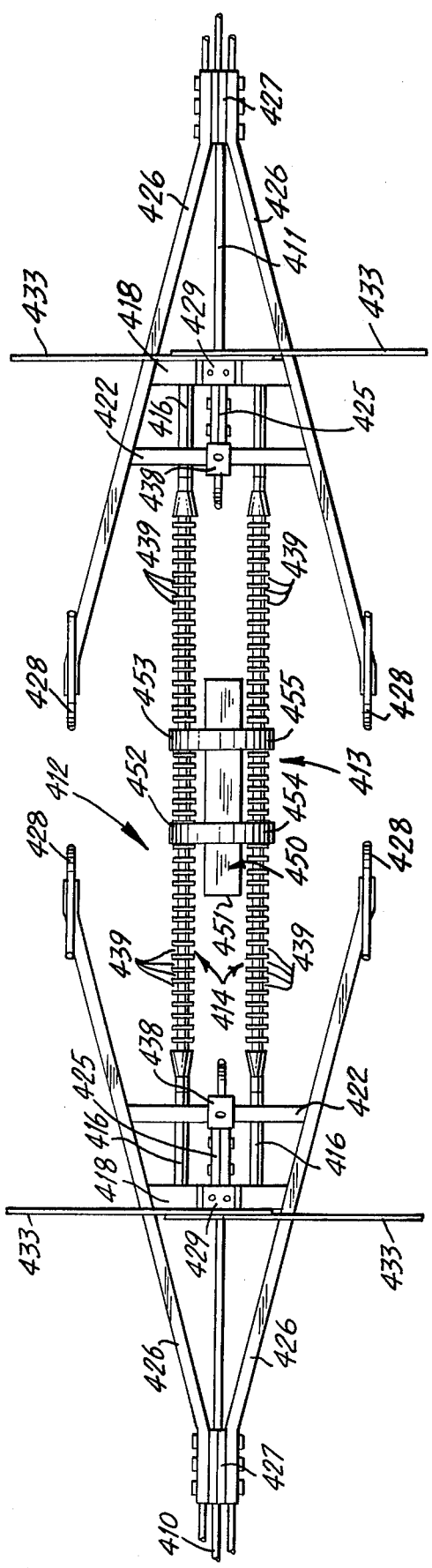
FIG. 14 is a top view of a fourth embodiment of the invention.

FIG. 14 illustrates another embodiment of the invention in a section insulator (or portion of a phase break). As before, corresponding parts to the above description for other embodiments have their numbers increased by 100 from FIG. 13. Here, both sets of guides 426 on each end of the section insulator extend outwardly in the manner shown at the left hand side of FIG. 12, but the guides also can be combined into long and short overlapping sections for a section insulator as described above if it is considered desirable to provide for passing of the vehicle current collector without interruption of the power supply. Arcing horns 428 are attached to the ends of the guides. In FIG. 14, however, grooves 439 extend all across the rods, and if the of FIG. 14 version is used without overlapping guides, a portion of the rods between the guides normally would be a riding surface for the current collector. Here, however, a plastic member 450 with an auxiliary lower plastic riding surface 451 (i.e. PTFE) is provided to extend longitudinally between the guides so that the current collector either rides on the guides 426 or surface 451 in passing through the device. Lower surface 451 extends slightly below the lowest extent of the rods so that the grooved rods are not contacted by the current collector. Plastic member 450 is rigidly attached to the rods 414 by four overlapping grooved clamp portions 452, 453, 454 and 455 attached to or integral with member 450, the grooved clamps mating with the grooves in the rods. The grooves 439 in the rods 414 provide the functions previously discussed, and by virtue of extending all the way across the rods provide added insulating characteristics.

Figure 15:
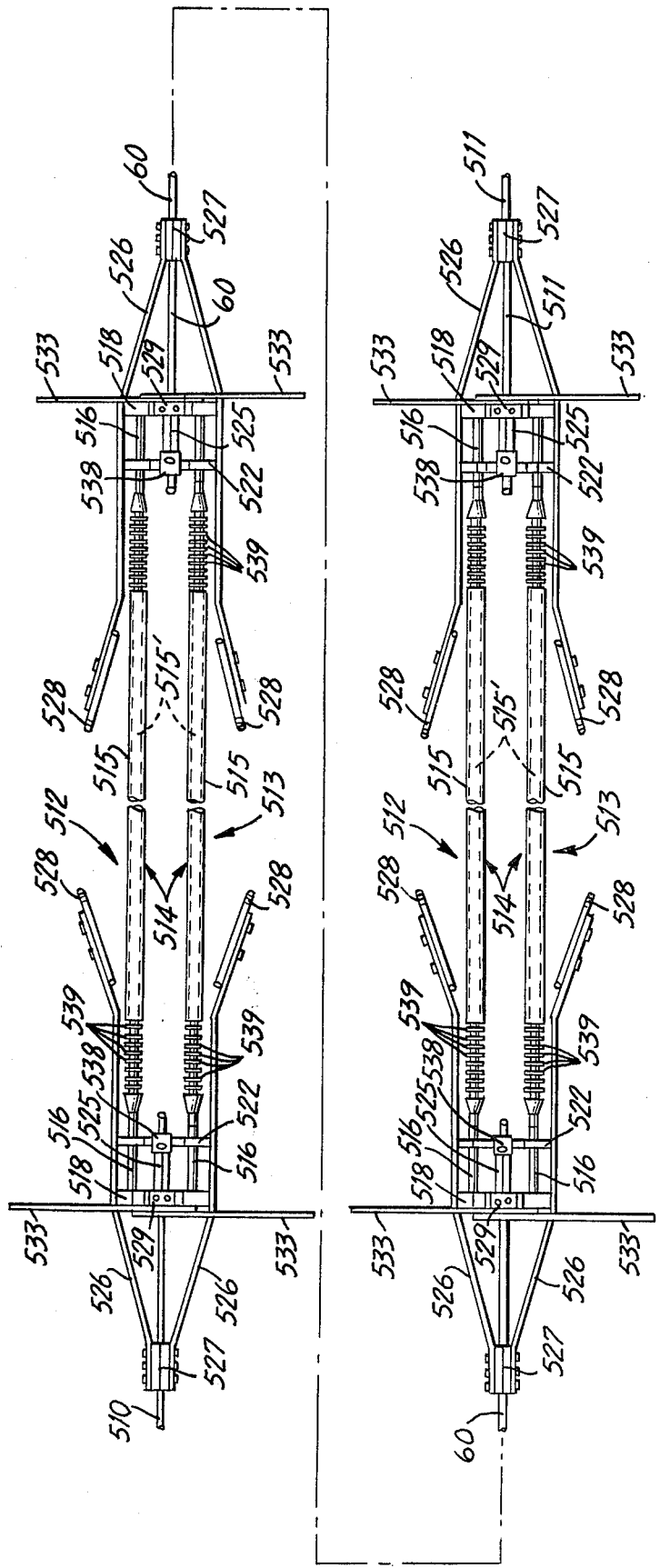
FIG. 15 is a top view of a fifth embodiment of the invention.

In FIG. 15, a further embodiment of the present invention is illustrated, wherein two identical section insulator sections such as shown in FIG. 14 (with or without the grooves extending and all the way across the rods) are connected together by a grounded or ungrounded contact wire 60 to form a phase break with a flexible center section. In this manner common identical modules may be used to manufacture either section insulators or phase breaks. Further, such a phase break may be used on a curve with one of the modules at an angle to the other because of the flexible connection between the modules. As before, parts corresponding to the earlier description herein have their numbers increased by 100 over those shown in FIG. 14.

It should be understood that various modifications of the present invention may be made without departing from the spirit and scope of the invention as hereinafter claimed.

What is claimed is:

1. A device for establishing an electrically insulating connection of high tensile strength between two sections of the contact wire of an overhead line, which device comprises:

two insulating rods of glass fiber which are located parallel to each other and side by side at a distance from each other and each of which is connected firmly on both ends with a coaxially located metal rod;

two first crosspieces placed above and across the contact wire, to which the two metal rods at one and the other end of each insulating rod, respectively, are firmly connected;

two first contact wire clamps for establishing a connection of high tensile strength between the two sections of contact wire and one and the other, respectively, of the two first crosspieces, which first contact wire clamps have means allowing placement on the contact wire from above;

two second crosspieces placed above and across the contact wire and located between the two first crosspieces, each second crosspiece being adjacent a first crosspiece to form a pair of crosspieces, with one first contact wire clamp being fastened between one first and one second crosspiece and the other first contact wire clamp being fastened between the other first and the other second crosspiece;

two pairs of guides, with the two guides of the one pair of guides being fastened to the one and the other side, respectively, of a pair of crosspieces, and the two guides of the other pair being fastened to the one and other side, respectively, of the other pair of crosspieces;

one of the two sections of each guide adjoining the segment fastened to the crosspieces extending laterally and at a distance from the nearest insulating rod and the other of these two sections approaching the contact wire and together with the corresponding end of the other guide of the pair, being connected at its end with the contact wire by means of a second contact wire clamp; and, the two second contact wire clamps having means allowing placement on the contact wire from above.

2. The invention of claim 1, wherein one fastening device each for a stay wire or stay rope is provided at the two second crosspieces to compensate the torque exerted on the pairs of crosspieces by the contact wire and the insulating rods.

3. The invention of claim 1, wherein each of the two first contact wire clamps are clamped to a rod which extends, parallel to the longitudinal axis of the insulating rods, from one to the other crosspiece of the corresponding pair of crosspieces and passes through both crosspieces.

4. The invention of claim 1, wherein a centered tapped hole is provided in each metal rod which is open toward the end facing away from the insulator and said hole is engaged by a bolt which passes through a hole in the first crosspiece.

5. The invention of claim 1, wherein the guides are perforated.

6. The invention of claim 1, wherein the crosspieces and the guides consist essentially of a light metal.

7. The invention of claim 1, wherein the insulating rods include a covering of a material which is a good electrical insulator, and grooves are provided in said covering.

8. The invention of claim 7, wherein said material is polytetrafluoroethylene.

9. The invention of claim 7, wherein the grooves are provided only in the section where the bottom surface of the insulator is lying higher than the sliding path of a current collector as defined by the guides located on the side.

10. The invention of claim 1, wherein the guides of one pair and of the other pair overlap, whereby the insulating rods can be passed by a vehicle current collector without interruption of the power supply to the current collector.

11. The invention of claim 1, wherein at least two of the four guides are attached to one or the other end of a transverse insulator which is fastened to the two insulating rods, preferably by means of two clamps, and consists of plastic.

12. The invention of claim 11, wherein fastening means for supporting wires or ropes are attached to the transverse insulator.

13. The invention of claim 1, wherein one arcing horn each is interchangeably attached to the ends of the guides.

14. The invention of claim 13, wherein the guides overlap and the arcing horn of the guide which is closer to the insulating rod is supported by a rod lying in the extension of the other guide, which rod forms one leg of a U-shaped part whose other leg is attached to the guide.

15. The invention of claim 13, wherein those of the arcing horns or guides, where an interruption of the current could take place, each carry one arc extinguishing chamber which is open from the bottom to the top.

16. The invention of claim 1, wherein the guides have a coating of plastic which covers them on the sides and on top.

17. The invention of claim 1, wherein each of the two insulating rods consists of two coaxially positioned insulating segments whose ends facing each other are firmly connected with each other by means of metallic rods with smaller diameters which in turn are attached to crosspieces to which are fastened guides which are located on the outside of the insulating rods.

18. The invention of claim 17, wherein the metallic rods connecting the ends of the insulating segments facing each other consist of three sections, the two ends sections of which are designed the same as the metallic rods which are firmly attached to the ends of the insulating rods pointing away from each other and the middle section of which is a spacer engaging the central tapped hole of the metallic rods.

19. The invention of claim 18, wherein the crosspieces are designed the same as that crosspiece of the two pairs of crosspieces which is closer to the end of the insulator.

20. The invention of claim 19, wherein three crosspieces are provided which are spaced at a distance from each other in the longitudinal direction of the metallic rods, with the middle one of these crosspieces holding the two spacers and being equipped with screws of which one each engages the spacer.

21. The invention of claim 20, wherein two supporting arms are attached to the middle crosspiece which extend toward the outside and to each of which a supporting wire or supporting rod is fastened.

22. The invention of claim 16, wherein exchangeable arcing horns are attached to the ends of the guides supported by the crosspieces.

23. The invention of claim 1, wherein supporting wires or supporting ropes are attached to laterally protruding supporting bars fastened to the crosspieces.

24. The invention of claim 1, wherein the first and second crosspieces have bottom recesses to partly engage and allow passage of the contact wire, and the second crosspieces have bottom recesses to engage and allow passage of the insulating rods.

25. The invention of claim 1, wherein two such identical devices are connected together by a contact wire section to form a phase break.

26. The invention of claim 7, wherein the guides of one pair do not overlap the guides of the other pair, the grooves extend across the length of each insulating rod, and additional means are attached to the insulating rods and having an auxiliary sliding surface extending longitudinally between the pairs of guides and slightly below the insulating rods, whereby a current collector passing through the device rides only upon the guides and auxiliary sliding surface and not on the insulating rods.

27. A device for establishing an electrically insulating connection of high tensile strength between two sections of the contact wire of an overhead line, which device comprises:

two insulating rods which are located parallel to each other and side by side at a distance from each other;

connection structures for joining one end of the contact wire with one end of both insulating rods and the other end of the contact wire with the other end of both insulating rods;

two pairs of current collector guides respectively joined to said connection structures; and, each of the two insulating rods comprising a fiber glass core and a concentric polytetrafluroethylene covering which, for at least part of its length, has grooves provided therein.

28. The invention of claim 27, wherein the connection structures have means allowing placement on the contact wire from above before cutting of the contact wire.

29. The invention of claim 27, wherein the insulating rods are positioned over part of their lengths to serve as riding surfaces for the current collector of a train, and the grooves are positioned only in sections of the insulating rods which are positioned higher than the sliding path of said current collector so as not to serve as riding surfaces for the collector.

30. The invention of claim 27, wherein the guides of one pair and the other pair overlap, the grooves extend across substantially the entire length of the insulating rods, the insulating rods are positioned higher than the lower surfaces of the guides, and the lower surfaces of the guides act as running surfaces for the current collector.

31. The invention of claim 27, wherein two such identical devices are connected together by a contact wire section to form a phase break.

32. The invention of claim 27, wherein the guides of one pair do not overlap the guides of the other pair, the grooves extend across the length of each insulating rod, and additional means are attached to the insulating rods and having an auxiliary riding surface extending longitudinally between the pairs of guides and slightly below the insulating rods, whereby a current collector passing through the device rides only upon the guides and auxiliary riding surface and not on the insulating rods.

33. This invention of claim 27, wherein the outer diameter of the polytetrafluoroethylene covering over the length of the rods having grooves therein is less than the outer diameter of the said covering in the adjacent length of the rods not having grooves.

34. The invention of claim 8, wherein the outer diameter of the polytetrafluoroethylene covering over the length of the rods having grooves therein is less than the outer diameter of the said covering in the adjacent length of the rods not having grooves.

* * * * *